United States Patent

Beck, Jr.

[11] 4,080,703
[45] Mar. 28, 1978

[54] RADIATING OR ABSORBING HEAT EXCHANGE PANEL

[75] Inventor: Edward G. Beck, Jr., Fort Thomas, Ky.

[73] Assignee: The Stolle Corporation, Sidney, Ohio

[21] Appl. No.: 702,939

[22] Filed: Jul. 6, 1976

Related U.S. Application Data

[63] Continuation-in-part of Ser. No. 601,174, Aug. 1, 1975.

[51] Int. Cl.² .......................................... B23P 15/26
[52] U.S. Cl. .................... 29/157.3 C; 165/171
[58] Field of Search ................ 165/151, 171, 182; 29/157.3 C, 157.3 D, 157.3 V, 157.3 A, 157.3 B

[56] References Cited

U.S. PATENT DOCUMENTS

| 1,992,795 | 2/1935 | Young | 165/151 X |
| 2,567,716 | 9/1951 | Kritzer | 29/157.3 C X |
| 2,666,981 | 1/1954 | Sandberg | 29/157.3 C |
| 2,722,732 | 11/1955 | Sandberg | 29/157.3 C |
| 2,823,016 | 2/1958 | Greer, Jr. | 29/157.3 C X |

Primary Examiner—C.W. Lanham
Assistant Examiner—V. Rising
Attorney, Agent, or Firm—Melville, Strasser, Foster & Hoffman

[57] ABSTRACT

A heat exchanger in the form of a heat radiating or absorbing panel is disclosed, which consists of an aluminum panel having a copper tube secured thereto in heat exchange relationship. The panel has at least one pair of parallel, spaced, retainer legs which have angularly inwardly extending flanges. A copper tube of circular cross section is laid into the channel formed by said retainer legs, and is then squashed by means of a die into a generally oval cross section which will be confined within the retainer legs. While so confined, fluid under pressure may be introduced into the tube to expand it into intimate contact with the panel, the retainer legs and the flanges. The assembly may then be heated during the expanding step to a temperature somewhat above the expected operating temperature of the assembly, to prevent loosening of the intimate contact between the tube and panel, which have different coefficient of expansion. Provision may be made to cause flow through the tube to be turbulent or swirling. Alternatively, the introduction of fluid under pressure, and the heating of the assembly, may be omitted, and the sum of the inside surface of the back of the panel between the flanges, the inside surfaces of the flanges, and the underside of the die between the flanges, may be made equal to the outside circumference of the tube. The exposed surface of the panel may be configured to increase its area and to provide good exposure over a wide range of angles of incidence. The heat exchange relationship between the tube and panel may be enhanced by interposing a thin layer of a synthetic resin therebetween; and the resin may have powdered metal entrained therein. If dimensional relationships alone are relied upon to provide intimate contact between the tube and panel, a mastic-like material in a thin film may be applied to the interface between the tube and panel to improve heat transfer and seal out moisture.

9 Claims, 12 Drawing Figures

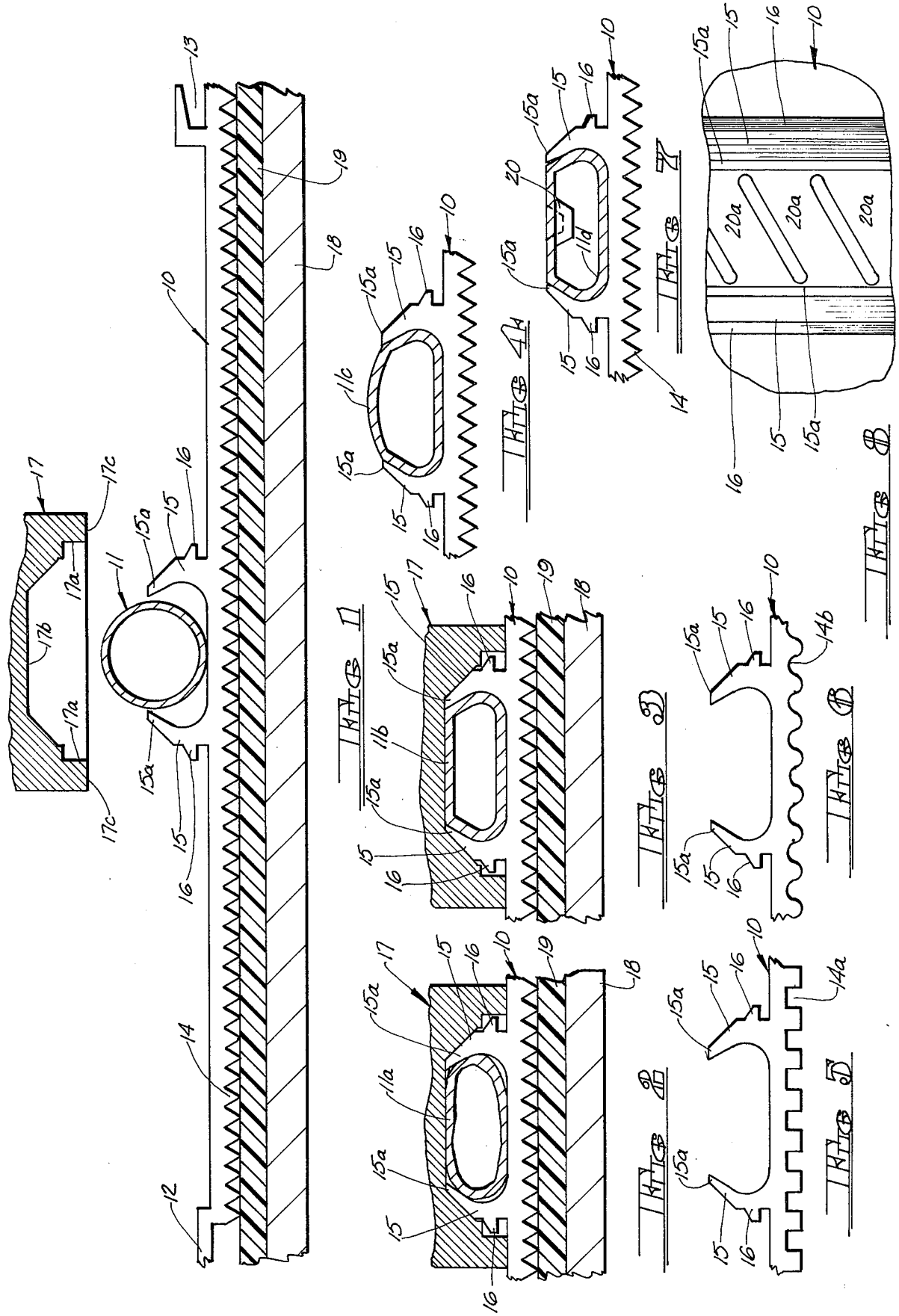

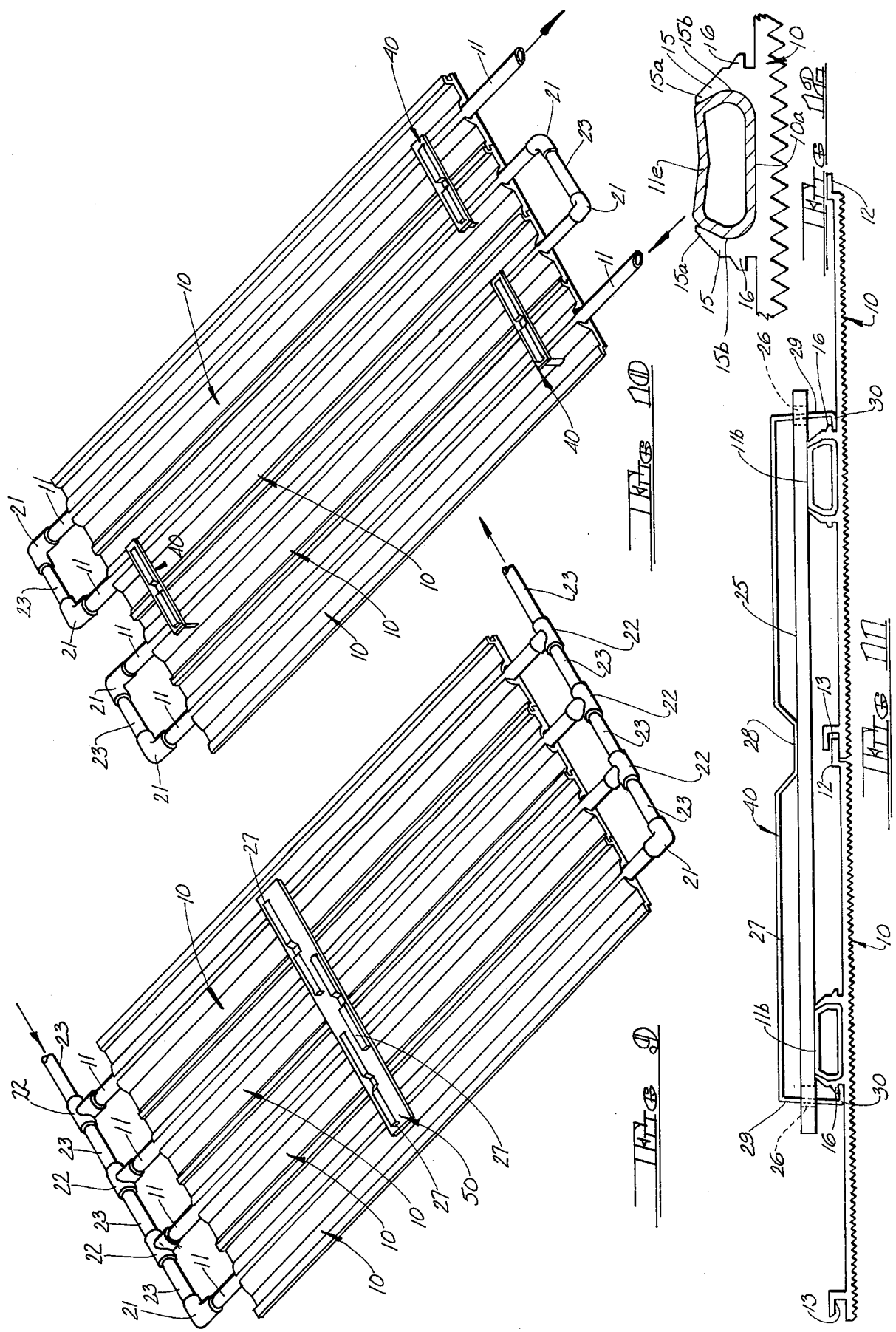

RADIATING OR ABSORBING HEAT EXCHANGE PANEL

CROSS REFERENCE TO RELATED APPLICATION

This is a continuation-in-part of copending application Ser. No. 601,174 filed Aug. 1, 1975 entitled RADIATNG OR ABSORBING HEAT EXCHANGE PANEL, in the name of Edward G. Beck, Jr.

BRIEF SUMMARY OF THE INVENTION

This invention describes an improved design of heat exchanger assembly by means of which radiant heat may be emitted into space, or radiant heat may be captured from space. It consists of a sheet or plate of metal, having assembled to it in good heat exchange relationship, a metal tubular member through which a fluid is circulated. When the fluid is heated by suitable means to a sufficiently high temperature, heat flows from the fluid to the tube and thence to the plate, raising the temperature of the plate to a level at which it emits radiant energy. On the other hand, when radiant energy which, captured from space, raises the temperature of the plate sufficiently, heat flows from the plate to the tube and thence to the fluid. In the first case, heat is supplied to the circulating fluid by an external source; in the latter case, heat is extracted from the fluid at an external location. It is to be understood that the surface of the sheet or plate facing space is preferably provided with a finish, such as paint, which enhances its absorbing or emitting capacity.

The literature describes numerous embodiments of heat exchangers substantially responding to the above general description and many such devices are available commercially. The present invention discloses a design which incorporates in one assembly various features which have never been present in any one design and means for making certain of the features more functionally effective in achieving maximum performance of the entire assembly. The application also discloses a method of making a heat exchanger panel.

The basic problem in all tube on plate heat exchangers has to do with the securing of the tube to the panel in good heat exchange relationship. Preferably the tube is copper and the panel is aluminum. Numerous structures have been devised and numerous methods have been proposed for securing a copper tube to an aluminium panel. Among these may be mentioned a series of patents based on applicant's earlier inventions. These are U.S. Pat. Nos. 3,514,834, 3,698,475, 3,703,758 and 3,776,538. The panels disclosed in the just mentioned U.S. patents have been used primarily for space heating and cooling in buildings. The panels of the present invention are intended primarily for extracting heat from the sun's radiation and using it to heat a fluid which can then be used in various ways as for heating residences, swimming pools, and for numerous other purposes.

According to the present invention, the aluminum panel is provided with elongated, upstanding retainer legs having angularly inwardly extending flanges, between which the tubing, initially of circular cross section, is placed. The outside diameter of the tubing is nearly twice the height of the retainer legs. The tube is then squashed so as to be distorted into an oval shape of reduced cross sectional area, which will be confined between the panel, the retainer legs, and the flanges. This is accomplished in a press having a die secured to the ram, the die having portions adapted to embrace the retainer legs and span the space between the ends of the flanges and the retainer legs.

In an embodiment, while the press holds the die in position on the panel, fluid pressure is introduced into the tube to cause it to expand into intimate contact with the panel, the retainer legs and flanges. It may be desirable in certain situations to coat the tube or the channel between the retainer legs with a thin film of a synthetic resin adhesive, with or without entrained powdered metal.

Since copper and aluminum have different thermal coefficients of expansion, that of aluminium being greater than that of copper, and since the panel will be operated at an elevated temperature, whether as a radiator or collector of heat energy, the panel will expand more than the tube, tending to loosen the intimate contact between the tube, the panel and the retainer legs and flanges. This problem is overcome by raising the temperature of the tube and the panel, at the time the expansion operation takes place, somewhat above the temperature at which the assembly will operate in actual practice. Then at any temperature below that at which the expansion was performed, the aluminum panel will have shrunk more than the tube, and thus initimate contact between the tube and the panel is maintained.

In another embodiment, the introduction of fluid under pressure, and the heating of the assembly may be omitted. In this embodiment the sum of the dimensions of inside surface of the back of the panel between the flanges, the inside surfaces of the flanges, and the underside of the die between the flanges, is made equal to the outside circumference of the tube. In this embodiment, a thin film of a mastic-like material is applied to the interface between the tube, the flanges and the back of the panel to improve heat transfer and seal out moisture.

BRIEF DESCRIPTION OF THE SEVERAL VIEWS OF THE DRAWINGS

FIG. 1 is a cross sectional view of a panel shown resting on the bed of a press and with a tube in position and showing in fragmentary form, the die ready to squash the tube into place.

FIG. 2 is a fragmentary view of the central portion of FIG. 1 after the die has squashed the tube.

FIG. 3 is a view similar to FIG. 2 after the tube has been expanded by internal pressure.

FIG. 4 is a view similar to FIG. 3 showing another embodiment.

FIG. 5 is a view similar to FIG. 4 showing a modification.

FIG. 6 is a view similar to FIG. 5 showing another modification.

FIG. 7 is a view similar to FIG. 4 showing a modification to produce turbulent flow through the tube.

FIG. 8 is a fragmentary plan view of a modification of FIG. 7 to produce a swirling flow through the tube.

FIG. 9 is a perspective view of a number of panels according to the invention connected together with the tubes in parallel.

FIG. 10 is a view similar to FIG. 9 but with the tubes connected in series.

FIG. 11 is a cross sectional view of two panels connected together and showing a spring clip to hold the panels together.

FIG. 12 is a cross sectional view similar to FIG. 7 showing a harmless change in configuration which may occur in another embodiment.

DETAILED DESCRIPTION

Basically, the heat exchanger panel consists of a metallic member generally indicated at 10 and a tube generally indicated at 11. The panel 10 is provided with a tongue 12 along one edge and a groove 13 along the opposed edge. Thus, the tongue 12 of one panel may be engaged in the groove 13 of an adjacent panel if it is desired to have a plurality of panels disposed side by side.

The face of the panel which will be exposed for either radiating or absorbing heat is shown in FIG. 1 with a saw tooth configuration indicated generally at 14. This configuration can be provided on the side opposite the tube, as shown, or in the areas lying on either side of the tube, if the tube side is to be the radiating or absorbing surface. The configuration indicated at 14 in FIG. 1 is considered desirable where the panel is to be used for absorbing solar energy because as the sun porgresses from horizon to horizon each day, the angle of incidence of the solar rays with respect to a fixed surface is continually changing. With the configuration of FIG. 1 there is a considerable range of angles of incidence within which the energy is forced to reflect from two surfaces rather than one before it escapes from the Vee. Since energy is released at each reflection, the effect is substantially to improve the efficiency of the collector. It will be understood that the surface could have other configurations than the saw tooth configuration 14, as for example the square indentations or crenellations indicated at 14a in FIG. 5 or the wave-like or sinuous indentations indicated at 14b in FIG. 6. The purpose of all of these configurations is to permit the panels to capture a greater amount of radiant energy from the sun as it moves from horizon to horizon.

The panel 10 is provided with a pair of upstanding retainer legs 15, each provided with a spur 16. Preferably the panel including the tongue and groove and the configuration at 14 and the retainer legs 15 and spurs 16 are formed by extrusion.

It will be observed that the upstanding retainer legs 15 have mutually opposed inwardly directed flanges 15a by means of which the tube 11, upon being squashed as hereinafter described, is held in assembly with the panel 10.

A die is indicated generally at 17 and is secured to the ram of a press. The panel 10 is placed on the bed 18 of the press with a layer of a resilient material 19 on the bed to support the member 10 and prevent mashing of the saw-tooth configuration 14 during the squashing and subsequent expansion operations. The layer 19 may be of rubber or a suitable plastic material.

The die is of such dimensions that the portions 17a clear the spurs 16 and the flat portion 17b abuts the ends of the flanges 15a while the portions 17c abut the rear surface of the panel 10.

Thus, in one embodiment, when the ram of the press descends with the die 17, the tube 11 is squashed to the configuration shown at 11a in FIG. 2. The relationship between the die and the panel 10 and the flanges 15a will be clearly apparent in this Figure. It will be understood that the tube 11 extends beyond the panel at each end so that connections may be made to it and that beyond the panel the shape of the tube merges into the original circular configuration. As will appear from FIG. 1, the distance between the inner edges of the flanges 15a is slightly greater than the outside diameter of the tube 11. The height of the tops of the retainer legs 15 is slightly greater than the radius of the tube 11.

It will be observed in FIG. 2 that at the end of the squashing operation the tube 11 is not in intimate contact with the inside surfaces of the retainer legs 15 and the flanges 15a and in order to bring the tube into intimate contact with these surfaces, it is necessary to apply internal pressure to the tube while it is held in position by means of the die 17. With the parts in the position of FIG. 2, fluid is introduced into the tube under sufficient pressure to expand it into intimate contact with the mating surfaces as shown in FIG. 3. At this point, pressure may be removed and the die 17 raised by means of the ram and the assembly may be then removed from the press.

In cases where the fluid pressure within the tubing in use will be quite high, as when a water hammer condition would arise, a flat top as at 11b would tend to bulge. Under those conditions it may be desirable to have the die 17 have a concave surface instead of the flat surface 17b so as to provide a convex cross sectional appearance for the tube as shown in FIG. 4 at 11c, which will better withstand such high pressures.

As a result of the use of internal fluid pressure to bring the tube into intimate contact with the retainer legs, the tubing is actually stretched. In actual practice in the production of a panel according to the present invention, the perimeter of the tube has been increased approximately 13% while its cross sectional area has been reduced by approximately 15%. It will be understood that this greatly enhances the heat exchange capability of the tube.

In order to enhance further the heat transfer capability of the tube it may be desirable to have the die 17 provided with members to produce dents or depressions as indicated at 20 in FIG. 7. These dents will produce turbulent flow through the tube, thereby improving heat transfer between fluid and tube. As a modification of this embodiment, the dents may be provided at an angle to the axis of the tube as indicated at 20a in FIG. 8. The configuration of FIG. 8 tends to produce a swirling or spiral flow through the tube which also enhances heat exchange between fluid and tube. It will be understood that the specific configuration and spacing of the indentations in order to achieve the most effective performance may be determined by testing for each particular design. Various conditions will have an effect on the selection of the type of indentations such as the volume of flow per unit of time and the pressure of the fluid flowing through the tube.

Since the panel is preferably produced by extrusion and since aluminum is a very readily extrudable material, it is desirable to make the panel itself of aluminum. For a number of reasons which are well known, the tube is preferably copper. Since aluminum and copper have different coefficients of expansion and since the panels when completed and in operation will be operating at a temperature well above ambient temperature, the aluminum panel will expand more than the tube. The result of this will be a loosening in the intimate contact between the mating surfaces of the tube and the retainer legs.

In order to avoid any such loosening, it is most desirable to have the expanding fluid at or above the proposed operating temperature, thus heating up the assembly before expansion takes place. When the mating members have reached the required temperature, flow of fluid through the tube is halted, the required pressure is then built up, and the rest of the operation proceeds as outlined above.

Since the mating surfaces are at an elevated temperature, i.e. a temperature above the intended operating temperature of the assembly, at the time they are forced into intimate contact, at any lesser temperature the panel member will have tended to shrink more than the tube and thereby intimate contact between the tube and panel is maintained.

In order further to improve the heat exchange capabilities of the assembly, it is desirable to use a very thin film of a synthetic resin adhesive at the interface between the mating surfaces of the tube and panel. It has been demonstrated experimentally that the presence of such a film improves heat transfer. Furthermore, when the tube is coated with a proper composition of a synthetic resin prior to assembly, the resins can become soft and flow relatively easily at elevated temperatures. When the expanding pressure is applied, all excess resin will be squeezed out of the interface, leaving a thin uniform film sufficient to seal out moisture and thin enough to enhance heat transfer. It will be understood that powdered metal may be incorporated into the adhesive.

An alternative, and perhaps simpler procedure, eliminates the introduction of fluid under pressure, and the heating of the assembly. This alternative involves careful proportioning of the flanges in relation to the outside circumference of the tube. The sum of the dimensions of the inside surface of the back of the panel between the flanges 15 (indicated in FIG. 12 at 10a) plus the inside surfaces of the flanges 15 (indicated in FIG. 12 at 15b) and the underside of the die 17b between the ends of the flanges 15a, is made equal to the outside circumference of the tube 11.

The proper dimensions are most easily achieved by trial and error, bringing the flanges 15 closer together or moving them farther apart by changing the extrusion die, until the tube is in contact with substantially the entire area bounded by the portions 10a and 15b.

In order to make allowance for manufacturing tolerances in the tube outside circumference, and extrusion dimensions, the relationships are worked out so that when the outside circumference of the tube is at the minimum of the tolerance, and the dimensions of the portions 10a and 15b are at a maximum, substantially complete contact is achieved. Then if either of the parameters mentioned above is at or near the opposite end of its tolerance range, accommodation is achieved by the tube wall in the area 11e (FIG. 12) bending slightly inward. Experience has shown that such deflection as may occur under these conditions is not great enough to alter materially the cross sectional area of the tube in its final configuration, as compared to what the area would be if the tube wall conformed to the die surface at 17b.

Outward bending of the flanges 15 must be avoided; but the flanges will be captured by the die surfaces 17a and the sloping surfaces between 17a and 17b before the pressure tending to bend the flanges outward reaches a dangerous level. Thus any deflection of the flanges will be so slight that no significant gap is opened up between the tube and flanges. The flanges may of course be made strong enough, by thickening their section, to prevent any possible deflection. In this embodiment it is desirable to use a mastic-like material in a thin film at the interface between the tube and the extrusion in order to improve heat transfer and seal out moisture. The material which is preferred and which works very satisfactorily is known as "Eccotherm TC-4" and is made by Emerson and Cuming. This material has excellent heat transfer qualities for a nonmetallic material. It is a proprietary mastic-like compound having relatively good thermal conductance and will remain plastic throughout the temperature range which might be encountered in service, namely, from 0° to 550° F. The difference in thermal coefficient of expansion between the copper and aluminum in absolute terms is actually very slight so that the mastic-like material will perform its heat exchange and sealing functions throughout substantially the entire temperature range. Therefore, it is possible to perform the assembly operation at room temperature rather than at an elevated temperature as in the first embodiment.

In FIGS. 9 and 10 there are shown four panels assembled together in tongue and groove relationship. Those of FIG. 9 have their tubes 11 connected together in parallel by means of suitable elbows 21 and tees 22. Because of this parallel connection, the individual panels 10 will be held rigidly in assembly with the respective tongues engaging in the adjacent grooves.

With the connection in series as shown in FIG. 10, the adjacent panels are held together only at their ends where the elbows 21 and cross tube 23 connect them together. At the opposite end the panels are not held together. For this reason, a spring clip is provided and its operation will be understood from FIG. 11. In this Figure, two panels 10 are shown with the tongue 12 of one panel engaging in the groove 13 of the adjacent panels. The connector clip comprises a metallic bar 25 of sufficient length to span across two tubes 11b. The bar 25 has two holes, one at each end, at 26 and a flat spring member 27 has a portion 28 resting against the bar 25 at its center and portions 29 extending through the holes 26 and portions 30 engaging under the spurs 16. The spring clip as a whole is indicated generally at 40. In FIG. 10, it will be seen that two spring clips are provided at the lower end of the panel and one at the upper end of the panel to provide means for holding panels together where they are not held together by the connecting tubing 23.

While the use of such clips is unnecessary in FIG. 9, there is shown an enlarged clip element 50 having three flat springs 27 so as to hold all four panels together. This arrangement is useful where the panels are extremely long and it may be found that the tongue and groove engagement midway of the length of the panel is not as tight as would be desired.

It will be understood that the panels have been shown as having only a central longitudinal tube. Each panel may have more than one tube and more than one pair of retainer legs 15. Furthermore, it will be clear that in some instances it might be desirable to have a portion of the assembly of panels connected in parallel and other portions in series. This can readily be accomplished by modifications of the arrangements of FIGS. 9 and 10.

It will be understood that numerous modifications may be made without departing from the spirit of the invention and therefore no limitation not specifically set forth in the claims is intended and no such limitation should be implied.

I claim:

1. A method of making a heat exchanger panel, which includes the steps of:

(a) providing a metallic panel having on one face a pair of parallel, spaced, longitudinally extending retainer legs, said legs having angularly inwardly extending flanges, (b) placing a metallic tube of circular cross section in the channel between said retainer legs, (c) deforming said tube by squashing it by means of a die to cause said tube to be distorted into an oval shape which is confined within the area of said panel, retainer legs and flanges, and extending between the ends of said flanges, thereby reducing the internal cross sectional area of said tube, and (d) holding said tube in its squashed relation to said channel, while subjecting the interior of said tube to sufficient pressure to expand it into intimate contact with the panel, retainer legs and flanges.

2. The method of claim 1 which includes the steps of coating said tube with a synthetic resin adhesive prior to placing it in said channel.

3. The method of claim 1, wherein said panel is of aluminum and said tube is of copper, and wherein at the time of said expanding operation, the temperature of said tube and panel is raised above the intended working temperature of the heat exchanger panel.

4. The method of claim 1, wherein the deformation of said tube is performed in a press, by placing said panel on the press platen, and providing a die for the ram of said press, which die snugly embraces said channel.

5. The method of claim 4, wherein said die is held in position during the said expansion step.

6. The method of claim 3, wherein said die is held in position during the said expanding operation.

7. A method of making a heat exchanger panel, which includes the steps of:

(a) providing a metallic panel having on one face a pair of parallel, spaced, longitudinally extending retainer legs, said legs having angularly inwardly extending flanges, (b) placing a metallic tube of circular cross section in the channel between said retainer legs, (c) deforming said tube by squashing it by means of a die to cause said tube to be distorted into an oval shape which is confined within the area of said panel, retainer legs and flanges, and extending between the ends of said flanges, thereby reducing the internal cross sectional area of said tube, and (d) dimensioning the longitudinally extending retainer legs and their inwardly extending flanges and the tube to be retained therein such that the sum of the dimensions of the inside surface of the back of the panel between the flanges, the inside surfaces of the flanges and the underside of the die between the flanges is equal to the outside circumference of the tube.

8. The method of claim 7 including the step of providing a mastic-like material comprising a metal compound in the vehicle which will remain plastic throughout the temperature range from 0° to 500° F.

9. The method of claim 7, such that substantially complete contact is achieved when the outside circumference of the tube is at the minimum of manufacturing tolerances and the dimensions of the inside of the channel are at a maximum.

* * * * *